United States Patent
Heyman et al.

(10) Patent No.: US 7,404,671 B2
(45) Date of Patent: Jul. 29, 2008

(54) DYNAMIC ACOUSTIC THERMOMETER

(75) Inventors: Joseph S. Heyman, Williamsburg, VA (US); Eugene V. Malyarenko, Williamsburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 43 days.

(21) Appl. No.: 11/372,628

(22) Filed: Mar. 9, 2006

(65) Prior Publication Data

US 2006/0203877 A1    Sep. 14, 2006

Related U.S. Application Data

(60) Provisional application No. 60/661,140, filed on Mar. 10, 2005.

(51) Int. Cl.
*G01K 11/22*    (2006.01)

(52) U.S. Cl. .................. 374/117; 374/118; 374/119; 374/4; 73/862.623

(58) Field of Classification Search ............ 374/117, 374/118, 119, 120, 1, 4, 5, 57, 44; 73/609, 73/615–618, 624, 629, 632, 645, 865.9, 862.59, 73/862.623
See application file for complete search history.

(56) References Cited

U.S. PATENT DOCUMENTS

| 3,214,976 | A | * | 11/1965 | Miller, Jr. | 374/117 |
|---|---|---|---|---|---|
| 3,290,944 | A | * | 12/1966 | Altman et al. | 374/201 |
| 3,454,472 | A | * | 7/1969 | Giuffrida | 205/188 |
| 3,538,750 | A | * | 11/1970 | Lynnworth | 374/45 |
| 3,595,082 | A | * | 7/1971 | Miller, Jr. | 374/119 |
| 3,946,377 | A | * | 3/1976 | Zetting | 340/550 |
| 3,983,424 | A | * | 9/1976 | Parks | 310/313 B |
| 4,075,883 | A | * | 2/1978 | Glover | 73/607 |
| 4,117,731 | A | | 10/1978 | Heyman | 73/579 |
| 4,246,784 | A | * | 1/1981 | Bowen | 374/117 |
| 4,288,790 | A | * | 9/1981 | Schnell | 340/628 |
| 4,353,256 | A | | 10/1982 | Moorey | 73/597 |
| 4,363,242 | A | | 12/1982 | Heyman | 73/761 |
| 4,445,389 | A | * | 5/1984 | Potzick et al. | 73/861.27 |
| 4,466,067 | A | * | 8/1984 | Fontana | 701/300 |
| 4,481,821 | A | * | 11/1984 | Chamuel | 73/617 |
| 4,513,749 | A | | 4/1985 | Kino et al. | 128/660 |
| 4,679,946 | A | * | 7/1987 | Rosencwaig et al. | 374/5 |
| 4,742,227 | A | * | 5/1988 | Takenaka | 250/336.1 |

(Continued)

FOREIGN PATENT DOCUMENTS

JP    60061622 A    *    4/1985

*Primary Examiner*—Gail Verbitsky
(74) *Attorney, Agent, or Firm*—Nixon & Vanderhye P.C.

(57) ABSTRACT

Acoustic temperature measurement at a remote location is provided. An acoustic source transmits acoustic radiation to an acoustic receiver along an acoustic path. The path passes through or near the remote location. The temperature is non-uniform along the path. A change in an integrated acoustic delay between the source and receiver along the path is measured. This acoustic delay can be either a phase velocity delay or a group velocity delay. The temperature at the remote location is determined by relating the measured change in integrated acoustic delay to the remote location temperature with a combined thermal-acoustic model. The combined model relates temperature to acoustic propagation velocity along the path. The combined model preferably includes temperatures of the source and receiver locations, and a heat source geometry at the remote location.

28 Claims, 6 Drawing Sheets

U.S. PATENT DOCUMENTS

| | | | | |
|---|---|---|---|---|
| 4,772,131 A * | 9/1988 | Varela et al. | | 374/119 |
| 4,810,100 A * | 3/1989 | Shavit et al. | | 374/40 |
| 4,848,924 A * | 7/1989 | Nuspl et al. | | 374/119 |
| 5,040,415 A * | 8/1991 | Barkhoudarian | | 73/198 |
| 5,062,086 A * | 10/1991 | Harlan et al. | | 367/38 |
| 5,144,590 A * | 9/1992 | Chon | | 367/57 |
| 5,214,955 A * | 6/1993 | Yost et al. | | 73/24.05 |
| 5,349,859 A * | 9/1994 | Kleppe | | 73/597 |
| 5,453,944 A * | 9/1995 | Baumoel | | 703/2 |
| 5,469,742 A * | 11/1995 | Lee et al. | | 73/597 |
| 5,544,525 A | 8/1996 | Peterman et al. | | 73/170.13 |
| 5,671,154 A * | 9/1997 | Iizuka et al. | | 702/39 |
| 5,698,786 A * | 12/1997 | Andersen | | 73/609 |
| 5,831,167 A * | 11/1998 | Andersen | | 73/602 |
| 5,981,860 A * | 11/1999 | Isozaki et al. | | 84/603 |
| 6,067,340 A * | 5/2000 | Eppstein et al. | | 378/4 |
| 6,120,449 A * | 9/2000 | Snyder et al. | | 600/447 |
| 6,253,621 B1 * | 7/2001 | Jarvis | | 73/655 |
| 6,279,379 B1 * | 8/2001 | Logue et al. | | 73/24.01 |
| 6,378,372 B1 | 4/2002 | Karr | | 73/579 |
| 6,388,947 B1 * | 5/2002 | Washbourne et al. | | 367/73 |
| 6,448,891 B2 | 9/2002 | Barnett | | 340/438 |
| 6,481,287 B1 | 11/2002 | Ashworth et al. | | 73/597 |
| 6,512,586 B2 * | 1/2003 | Maris | | 356/432 |
| 6,587,213 B1 * | 7/2003 | Knight et al. | | 356/502 |
| 6,612,156 B1 * | 9/2003 | Hakimuddin | | 73/61.75 |
| 6,834,992 B2 | 12/2004 | Draxton et al. | | 374/115 |
| 2004/0039285 A1 * | 2/2004 | Ustuner et al. | | 600/459 |
| 2005/0072236 A1 | 4/2005 | Heyman et al. | | 73/602 |
| 2005/0089077 A1 * | 4/2005 | Jones et al. | | 374/119 |
| 2005/0217388 A1 | 10/2005 | Heyman et al. | | 73/827 |

\* cited by examiner

DYNAMIC ACOUSTIC THERMOMETER

CROSS REFERENCE TO RELATED APPLICATIONS

This application claims the benefit of U.S. provisional application 60/661,140, filed on Mar. 10, 2005, entitled "Dynamic Acoustic Thermometer", and hereby incorporated by reference in its entirety.

GOVERNMENT SPONSORSHIP

This invention was made with Government support under contract number SB1341-04-W-1127 from the National Institute of Standards and Technology. The Government has certain rights in this invention.

FIELD OF THE INVENTION

This invention relates to acoustic temperature measurement.

BACKGROUND

A straightforward approach for temperature measurement is to place a thermometer in thermal contact with an object to be measured and allow the combination of thermometer and object to come to a thermal equilibrium characterized by uniform temperature. In this simple case, the object temperature can be read from the thermometer. Temperature measurement is more challenging when one or more of the preceding steps are impossible or impractical. For example, it is often desirable to measure temperatures at locations where it is undesirable (or even impossible) to place thermal sensors.

For example, in gun tubes, the drilling of a hole in which one inserts an electrical or optical thermal probe can damage the gun. The probe has to survive an extremely hostile environment and its re-use may be in question. For measurements of temperature in liquids, the probe has to be inserted into the liquid. This can contaminate the liquid and for very high resolution, produce errors in the measurement. The errors come from thermal paths that inevitably accompany the wires and sensor. Furthermore, some mediums are highly damaging to sensors, such as high temperature shocks, acids and other reactants. A sensitive gauge can be quickly destroyed in such an environment unless it is protected or coated. Such protection tends to introduce errors in the measurement. A thermal sensor can also undesirably alter normal medium dynamics. For example, in aerodynamic flows the presence of a thermal sensor on a surface can perturb air flow past the surface, thereby bringing the temperature measurements into question. Various remote temperature sensing methods have been developed in order to address such applications.

One class of remote temperature sensing methods is based on the use of acoustic radiation as a temperature probe. The basic physical effect exploited in such methods is the temperature dependence of an acoustic wave propagation velocity (either phase velocity or group velocity). For example, U.S. Pat. No. 6,834,992 considers an acoustic pyrometer, where an average temperature along a path (e.g., a path passing through a flame) is measured by propagating an acoustic signal having a short rise time along the path. A transit time of the acoustic signal is determined by comparing the transmission time of the rising edge with the reception time of the rising edge. An average temperature is determined from the transit time. Another example is U.S. Pat. No. 5,214,955, which considers a phase lock loop system for measuring temperature induced changes in acoustic phase velocity. Further examples of acoustic remote temperature sensing are considered in U.S. Pat. Nos. 4,353,256, 5,469,742, 6,378,372, and 6,481,287.

A further refinement of acoustic remote temperature sensing is considered in U.S. Pat. No. 4,513,749, where localized acoustic remote temperature sensing is provided by the use of two overlapping acoustic beams, one focused and the other unfocused. The relative phase between the two beams depends on the acoustic properties at the focal region of the focused beam, and is insensitive to acoustic properties elsewhere. Since the relative acoustic phase is only affected by temperature changes in the focal region, localized remote temperature sensing is provided.

Most conventional acoustic remote temperature sensing methods rely on having a constant temperature along the acoustic propagation path. In such cases, the relation between an acoustic path delay and the path temperature is straightforward. For example, reflections of acoustic pulses from marks on a rod have been employed. The rod is the thermal sensor (due to its thermal expansion) and must be placed into the medium to be measured. Other ultrasonic thermometers are based on the resonance frequency of a thin disk. Again, the thin disk must be placed into the medium of interest. Neither of these devices can be used accurately unless they are at constant temperature. However, in some cases of interest (e.g., when measuring a dynamic change in temperature), the temperature will not be uniform along the acoustic propagation path.

Some remote thermal sensors measure a rate of temperature change, which when combined with knowledge of the time constant of the sensor can determine the end-point temperature at a remote location from the slope of the temperature rise. Such devices tend to have a time lag until the thermal sensor first sees a change in temperature, due to (relatively slow) thermal transport from the remote location to the sensor. Mounted to a thick gun tube, such a sensor cannot see the initial super-hot temperature created by an explosion. Instead, it can only see the influence of that heat pulse after it diffuses through the thickness of the tube.

Accordingly, it would be an advance in the art to provide acoustic remote temperature sensing that does not require a constant path temperature, that is suitable for dynamic temperature measurements, and that is not limited in response time by slow thermal transport.

SUMMARY

The technology described provides acoustic temperature measurement at a remote location. An acoustic source transmits acoustic radiation to an acoustic receiver along an acoustic path. The path passes through or near the remote location. The source and receiver can be at the same location (e.g., if a single transducer acts as both source and receiver), and in such cases, the path is a round trip. In other cases, the source and receiver are at separated locations, and the path is one way. The temperature is non-uniform along the path. In particular, the temperate at the source location is different from the temperature at the remote location, and the temperature at the receiver location is different from the temperature at the remote location. A change in an integrated acoustic delay between the source and receiver along the path is measured. This acoustic delay can be either a phase velocity delay or a group velocity delay.

The temperature at the remote location is determined by relating the measured change in integrated acoustic delay to the remote location temperature with a combined thermal-acoustic model. The combined model relates temperature to acoustic propagation velocity along the path. The combined model preferably includes temperatures of the source and receiver locations, and a heat source geometry at the remote location. The heat source geometry can be a simplified model (e.g., a 1-D heat equation model) or a more realistic model (e.g., 2-D or 3-D heat transport model with realistic boundary conditions), depending on application requirements.

The integrated acoustic delay can be determined from phase or frequency measurements. In particular, the radiation can be held to a constant frequency and the delay can be determined from an acoustic phase measurement. Alternatively, the acoustic phase can be held constant (e.g., by controlling frequency in a phase locked loop) and the delay can be determined from an acoustic frequency measurement.

Some example embodiments provide the capability of measuring a remote temperature distribution. More specifically, multiple acoustic paths are defined (e.g., with multiple acoustic transducers and/or by mechanically moving a transducer to multiple separated locations during a scan). By relating integrated acoustic delays along each of these paths to temperature via the combined thermal-acoustic model, lines of temperature data are obtained. The remote temperature distribution can be determined from these lines of data by performing a tomographic inversion.

The technology has various applications. For example, one application is to sensing temperature on the interior surface of a gun barrel. In this example, the remote location is at the interior surface of the gun barrel, and the source/receiver location is at the exterior surface of the gun barrel. The acoustic path can be a round trip from an exterior transducer to the interior bore surface back to the transducer.

Several advantages are especially relevant for this gun tube application. In particular, drilling into the gun tube is not required. Therefore, this approach does not in any way compromise the integrity of the tube, can easily be retrofitted to existing systems and can be part of next generation weapon system as a hardened sensor. The technology can be implemented on thick-walled steel as used in gun tubes. In addition, internal thermal gradients along the inner bore surface can be measured. Example embodiments can provide gun bore temperature (even dynamic temperature) in real or near-real time, and can also be used to assess barrel wear. Since the technology uses ultrasonics, it can also serve double duty as an acoustic emission sensor, archiving any anomalous gun behavior for maintenance considerations. This can be done using helical ultrasonic tomography. The measurements can all be performed from the outside of the measured solid volume. Therefore, for a gun tube, the sensors are placed outside the barrel (in a survivable environment) and can measure the dynamic thermal gradients at and near the bore (which is a much less survivable environment).

Another example application is to radiation dosimetry. A radiation dose standard is an essential calibration element assuring that the equipment is functioning properly. Measuring micro-degree temperature changes is a classic problem in radiotherapy dosimetry methods that use calorimetry. The dose standard is based on the absorbed radiation energy imparted to a water phantom from a radiation source. The absorbed dose induces an increase in the temperature of the water phantom. A precise measure of the change in water temperature is required to convert the thermal data into absorbed radiation dose. A water phantom includes a water tank, where the acoustic source and receiver are on the walls of the tank, and the acoustic path is through the water. A dose of radiation provided to the water can be precisely characterized by measuring the corresponding temperature change in the water. In this manner, the water can serve as a phantom for dosimetry calibration. By employing tomography as described above, the spatial distribution of radiation delivered to the water phantom can be determined. Such radiation can be ionizing radiation (e.g., X-rays) or can be non-ionizing radiation such as microwave radiation, optical radiation, acoustic radiation, etc. The technology is also applicable to in vivo radiation dosimetry, by replacing the water phantom with a patient or object being treated with radiation, and directly measuring temperature changes.

Further example applications include heat-flux measurements for wind tunnel experiments, and remote temperature measurement for process control (e.g., in distillation stacks) to measure temperature inside process vessels. This capability is especially valuable for high-pressure containers such as chemical reactors and industrial process systems. The combination of hidden (outside) wall access of temperature and temporal resolution in the micro to millisecond range for thick-walled reactor vessels can enable enhanced process control. Heat transfer from the core of a nuclear reactor to the coolant can be measured. Bearing temperature can be remotely sensed in real time, to provide warning of imminent overheating-related failure. Temperatures during spacecraft re-entry can be monitored (e.g., in thermal insulation). In heating plants and energy plants, internal fire-box temperatures can be monitored to assess if localized dynamic heating exceeds design requirements. Temperature changes during materials processing (e.g., boule growth for semiconductor applications) can be monitored. Efficiency of heat transfer in heat transfer systems can be accurately and directly measured.

DETAILED DESCRIPTION

Figure 1:
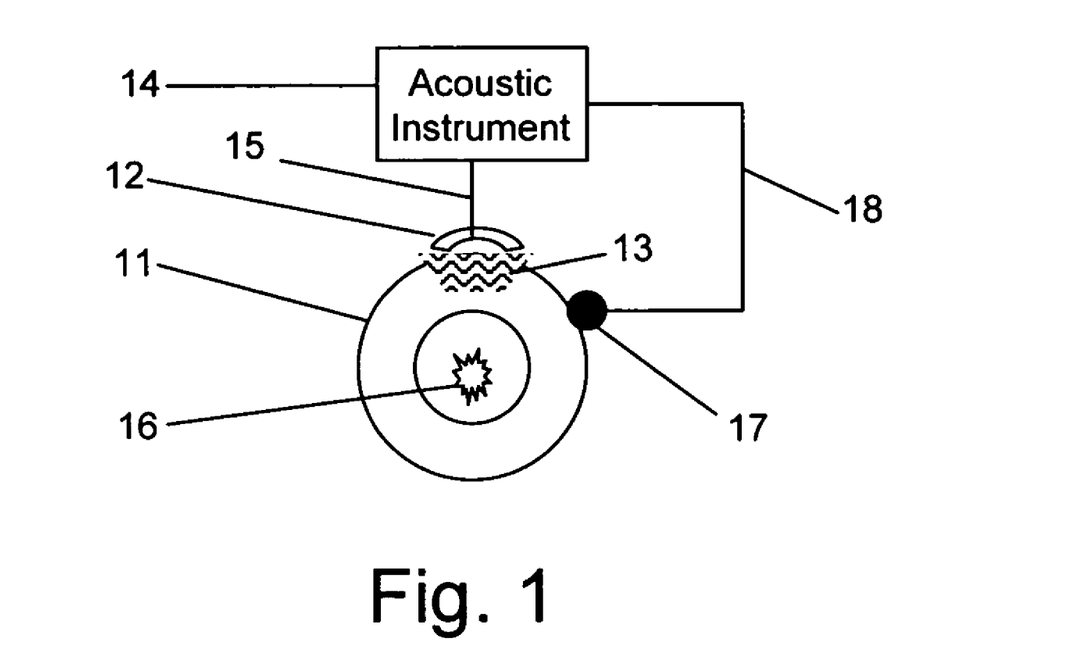
FIG. 1 shows an example non-limiting embodiment.

FIG. 1 shows an example embodiment attached to a containment tube 11 (e.g., a gun barrel). An acoustic transducer 12 is bonded to or is integral with the outside of the tube. In operation, the acoustic transducer 12 launches an acoustic wave 13 that propagates into the tube striking the inner surface and reflecting back to the transducer 12. The transducer 12 is stimulated to produce the acoustic wave by an acoustic instrument 14 connected to the transducer (e.g., by a wire 15). In alternative embodiments the acoustic instrument 14 can communicate with the transducer 12 via a fiber optic or wireless connection. A pulse of heat 16 is introduced to the system by, for example, an explosion in the gun tube. A conventional thermal sensor 17 is bonded to or is integral with the outside of the tube for long-term calibration. The output of the sensor 17 is transmitted to the acoustic instrument (e.g., by a wire 18, or it can be transmitted by fiber optics or wirelessly). The outside surface temperature is part of the model calculation used to determine the heat-flux entering the containment vessel. For fast internal heat pulses, the outside temperature does not change until long after the heat pulse. However, for slowly introduced heat, such as in a continuous process such as a heat plant, the outside temperature is a data entry into the model.

The acoustic instrument 14 measures the propagation parameters of the tube and the change in these parameters as a function of time. Preferably, these changes are measured with a phase-locking instrument (such as a quantitative ultrasonic system able to determine precise time shifts by calculating phase shifts from digitized wave forms or a pulsed phase lock loop coupled with a frequency counter and a system processor such as a computer) that keeps the acoustic frequency locked to a constant phase point and tracks the change in frequency required to maintain the lock. U.S. Pat. No. 4,363,242 relates to an example pulsed phase lock loop device. In this example embodiment, the acoustic phase velocity is the parameter of interest, and the phase locked loop effectively measures changes in the integrated acoustic phase delay. In alternative example embodiments, changes in the integrated acoustic group delay can be measured, and in such cases, it is the acoustic group velocity that is the physical parameter of interest. Such phase locked loops can be implemented in analog electronics, digital electronics, or any combination thereof.

For a path length L, the points of equal phase in an acoustic resonator are given by $F_m = mV/(2L)$, where F is the lock frequency, m is the harmonic number, and V is the velocity of sound. In FIG. 1, L is the effective path length from the outer surface of the tube to the inner surface and the acoustic wave is directed so as to follow a path perpendicular to the outer surface. The term "effective" includes the influence of the transducer itself on the measurement since in reality the gun tube, the bond coupling the tube to the transducer, and the transducer itself are all part of a composite element. The frequency that is measured combines all elements in the system, the gun tube, the bond, the transducer, the temperature-dependent velocity and the temperature dependent length.

Figure 2:
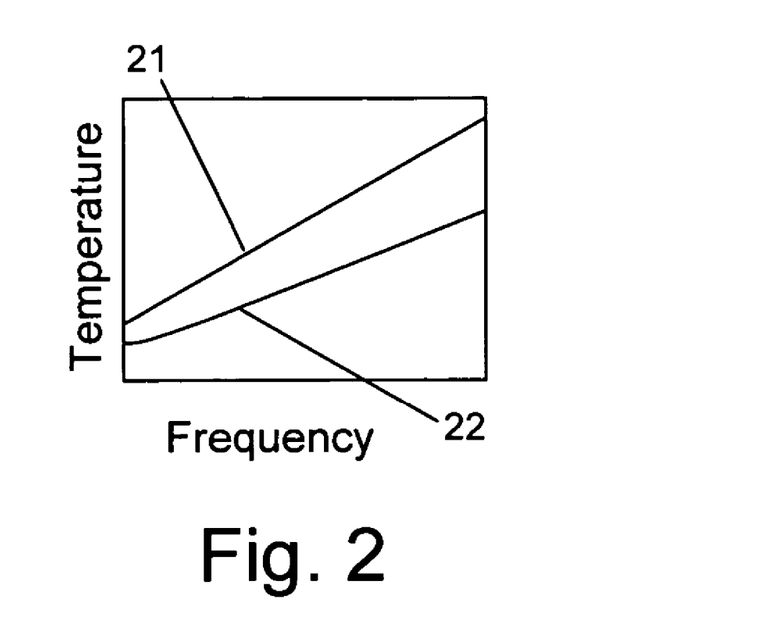
FIG. 2 shows the response of the tube of FIG. 1 for two different situations.

FIG. 2 shows the response of the tube of FIG. 1 for two different situations. Here is shown the calibration of the material and its geometry with the sensor for equilibrium temperatures. To measure this response, the temperature is slowly changed from cold to hot so as to keep the tube close to thermal equilibrium (uniform temperature throughout the thickness). One such calibration is shown for a linear response 21 and for a nonlinear response 22.

Two aspects of the technology include: 1) Accurate measurement of small changes in integrated acoustic delay along a path from an acoustic source to an acoustic receiver; and 2) determining a temperature of a remote location on or near the path by relating the measured changes to remote location temperature with a combined thermal-acoustic model. The combined thermal-acoustic model relates a non-uniform temperature along the path to a non-uniform acoustic velocity along the path. In this manner, temperature measurements can be performed in a dynamic manner that does not require equilibrium (or steady state)

Accurate measurements of small changes in acoustic delay have been demonstrated in extensive experiments with a technology prototype relating to measuring water temperature changes in a 3".times.3".times.3" water tank having 0.375" thick acrylic walls. A temperature resolution of better than 6 .mu.K at room temperature for average temperature change along a round trip path through the water was obtained when no stirring was performed. The temperature resolution was 110 .mu.K when a magnetic stirring bar was in the tank and rotating at 60 rpm. It is expected that further optimization will provide significantly improved thermal resolution. Temperature changes from a radiant heat source (a 500 W halogen lamp) and from a contact heat source (a resistor in the water) were characterized. For example, a 2 s lamp flash induced a 232 .mu.K average temperature change in one test. Detailed time-evolution of heat flow is apparent in these results. For example, when a lamp flash was used to heat the water, some of the lamp energy is absorbed in a transparent top cover of the tank. Some of this absorbed energy ends up heating the water in the tank, and this secondary temperature effect was clearly observable in the measured results. In contrast, when a resistor is used as the primary heat source, no secondary temperature effect was observed.

After a heating event, the return of the water tank to equilibrium has been monitored. Distinct peaks in a temperature vs. time plot (with the linear trend removed) have been observed, and are attributed to convective heat transfer, since convection is expected to be the dominant transfer mechanism in these experiments. The multiple peaks are attributed to circulation of water in the tank (e.g., a volume of water having a locally elevated temperature can pass through the acoustic path several times as equilibrium is approached).

Several practical issues were noticed in these experiments that may be relevant for other applications. The sensitivity of the measurement is such that extraneous sources of heat should be reduced/minimized as much as practical (e.g., in the tank experiments, the tank was placed in a Styrofoam box having 4" thick walls, and the tank walls were made of acrylic, selected for its low thermal conductivity). The time it takes the sample under test to reach an equilibrium or steady state temperature distribution should be accounted for, to avoid measuring temperature changes other than the effect of interest. In preliminary experiments, a larger tank (2.5 gallons) was employed, but it took too long to come to equilibrium. Stirring can reduce the amount of time it takes to reach steady state, but stirring also introduces noise, as indicated above.

The acoustic geometry may be simple (e.g., a single path from source to receiver, or a simple round trip path starting and ending at an acoustic transducer). Multiple acoustic paths and/or spurious acoustic reflections reduce measurement accuracy and should be avoided. In particular, in embodiments making use of a phase locked loop, the acoustic phase should be a single-valued function of acoustic frequency. When multipath effects and/or multiple reflections are important, the phase is not a single-valued function of frequency, which may compromise measurement performance. In the above experiments, a thick-walled tank was helpful for removing acoustic reverberation/reflection in the tank walls.

The second aspect of the technology is a combined thermal-acoustic model for relating the non-uniform temperature along the path to the non-uniform acoustic wave velocity along the path. As an example of such a model, we consider a 1-D heat transfer model (e.g., from the inside of a gun tube to the outside of the gun tube). The thermal differential equation for such a system is $$C_v \frac{dT}{dt} = k \frac{d^2 T}{dz^2},$$

where $C_v$ is the specific heat of the material and k is the diffusivity. The temperature as a function of time and position is given by $$T(t,z) = Ts + \frac{Q}{A\sqrt{\pi k C_v t}} \exp\left(\frac{-C_v z^2}{4kt}\right)$$

where Ts is the initial temperature, Q is the heat input (assumed to be delivered impulsively at t=0 and z=0), and A is a calibration constant that can be determined experimentally. The acoustic part of the combined model is a relation between temperature and acoustic velocity along the path. This relation depends on the materials along the path, and on the kind of acoustic wave propagating along the path (e.g., transverse, longitudinal, surface or bulk). Acoustic velocity as a function of temperature for various acoustic modes is well known for many materials, and can also be determined by measurement if necessary.

Taking z=0 as the inside bore surface of the tube, this model can be applicable to our test configuration. In particular, parameters of the model can be used to generate modeled predictions of acoustic propagation (i.e., changes in integrated acoustic delay). By fitting the modeled predictions to measured changes in integrated acoustic delay, the model parameters can be determined by fitting to the measured data. Unlike other systems that measure just temperature, this approach can assess the inner bore temperature as a function of time using the ultrasonic data to assess the thermal flux and temperature gradient.

Figure 11:
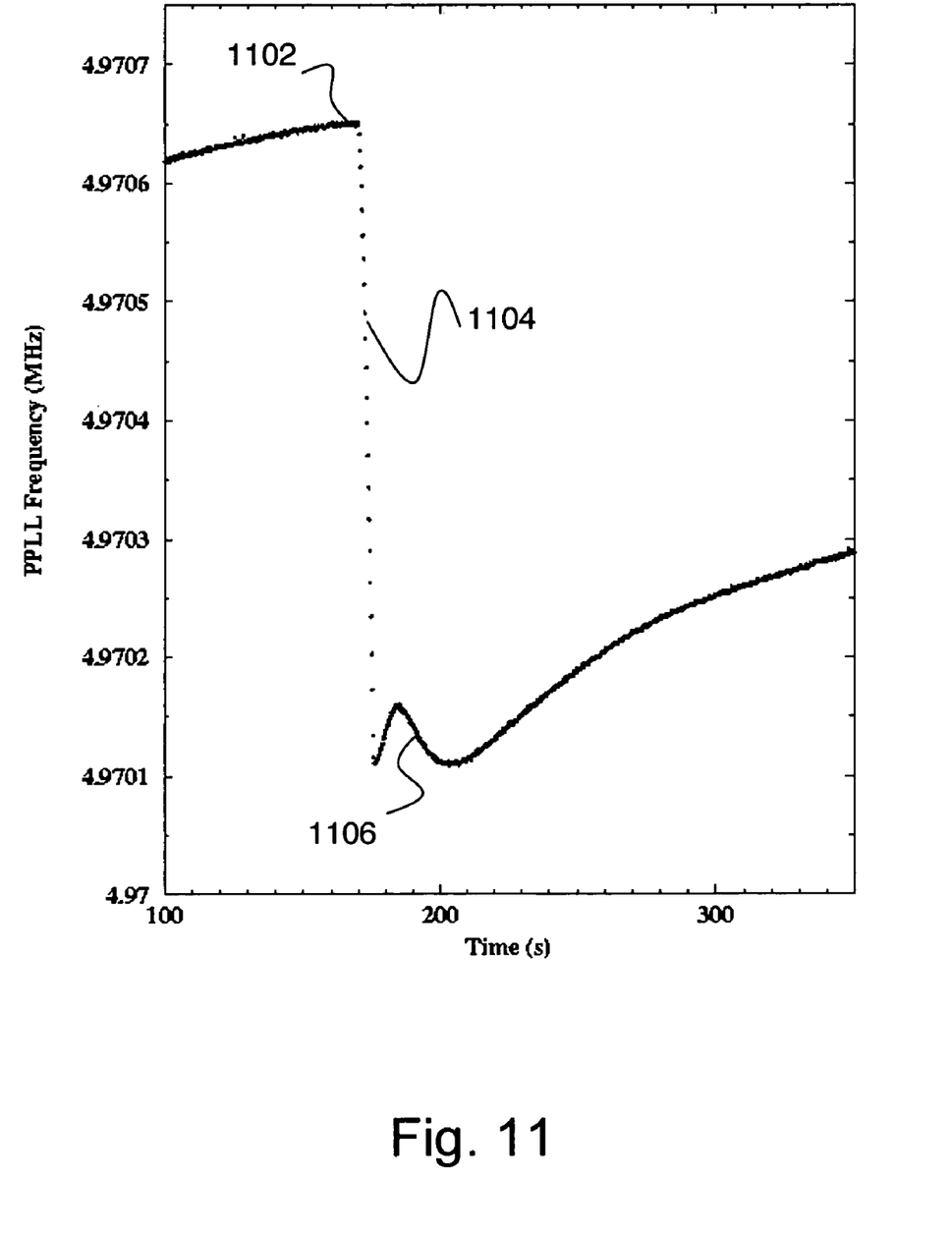
FIG. 11 shows experimental results from an example embodiment.

A proof of concept experiment for this approach has been performed. A pulsed phase locked loop was coupled to an ultrasonic transducer in contact with a thick steel plate. The back surface was exposed to a heat gun for a few seconds. The ultrasonic system immediately responded to the thermal energy, long before the thermal wave had propagated from the back face to the front face where the sensor was located. FIG. 11 shows experimental results obtained from a similar arrangement. A pulsed heat input is provided to a remote location on the far side of a thick plate. The initiation of this event is shown by a sharp change in slope at 1102, followed by a transition to a higher temperature on a time scale set by thermal diffusion (1104). A sample boundary effect 1106 is apparent in the data, as is the slow cooling off of the remote location after 1106.

The following method is an example of a suitable method for employing data as in FIG. 11 to obtain the remote location temperature.

1. Calibrate the system:
   1.1 Measure the temperature dependence of sound speed in the gun barrel wall
   1.2 Measure the thermal expansion coefficient of the gun barrel wall.
   1.3 Measure the temperature dependence of the phase delay (or frequency depending on the measurement system) for the gun tube wall. This measurement is the basis of the calibration folding together all effects caused by near equilibrium temperature changes.
2. Analytically solve 1D thermal diffusion equation in the gun barrel wall with initial conditions.
3. Integrate analytical solution over the wall thickness to estimate average temperature in the barrel wall as a function of time and initial temperature in the bore.
4. Record PPLL frequency (or phase delay) history of a firing round (or thermal pulse).
5. Convert PPLL frequency (or phase delay) into the average temperature between the inner and outer walls of the barrel.
6. Compare with analytical results and derive the initial temperature in the bore by inverting the thermal diffusion model.
7. Add the pressure-induced barrel dynamic strain which can also be extracted from the data using the thermal model as a baseline for temperature and the "ringing" of the tube as a brief dynamic event superimposed on the thermal processes.

The technology enables the remote measurement of the spatial distribution of internal temperature on a thick-walled structure from outside that structure. Some embodiments can assign a temperature to each volume element in a tube. Embodiments can also monitor the thermal profile as a function of time with a response time orders of magnitude faster than that achieved with a conventional surface mounted sensor. Applications are broad and far-reaching and go beyond gun monitoring. For example, such sensors can be critical for nuclear reactor heat exchangers, machinery sensors, and chemical reactors.

The technology does not require placing a sensor close to the inner bore surface. Instead, an ultrasonic wave propagates to a remote location (e.g., the inner surface of the gun tube), and acts as a dynamic temperature probe. In particular, the temperature at the remote location is different from the temperature at the acoustic source location or at the acoustic receiver location. The bore surface temperature can be wirelessly transmitted to a gun control panel using, e.g., Linx, Bluetooth or 801.12 protocols. In a typical application, the technology can be used to measure the temperature of a 5-inch gun wall thickness 40 inches from the breech area. The measurements can be performed using ultrasonic reflection tonebursts.

Ultrasonic velocity is a property of a solid based on the density and elastic constants of the material. Temperature alters the sound velocity of steels in a well-characterized way. We have performed many tests on material systems to characterize the thermal derivative of velocity to assess higher-order elastic properties. One example embodiment of this system is a through-the-thickness system based on a simple 2-D thermal model coupled to a high-resolution, low-cost ultrasonic reflection spectrometer.

The system determines the integrated ultrasonic velocity of the tube metal. Within that data is the contribution of the surface temperature and the diffusion of heat from the bore toward the outside of the gun. Within the transducer is a surface thermometer that gives the tube surface temperature at all times. The internal surface is heated by the explosion and residual hot gas after a shell is fired. Thermal diffusion from the hot internal surface creates a thermal wave that diffuses to the outer surface of the gun. Knowing the diffusion time constants of the tube, the ultrasonic velocity measurements can be inverted to provide a time-temperature record providing a measure of the internal surface temperature. The external thermometer is used to track the long-term thermal history and provide a baseline for the model. Unlike a surface (or in-hole) temperature sensor alone, the device actually senses the thermal field through the entire thickness.

The velocity of sound is strongly affected by temperature in steel. A rule of thumb is that for every 100 degrees Fahrenheit temperature increase, there is a 1 percent decrease in sound velocity. An initial calibration can be performed based on gun steel measurements. For a given tube, a specific gun velocity/temperature [V(T)] profile based on equilibrium conditions can be determined. This data can be acquired automatically using the external temperature sensor, the model of diffusivity in the tube and the time history of the system measurements. This provides a baseline V(T) for hot gun measurements specifically calibrated for each tube.

Figure 10:
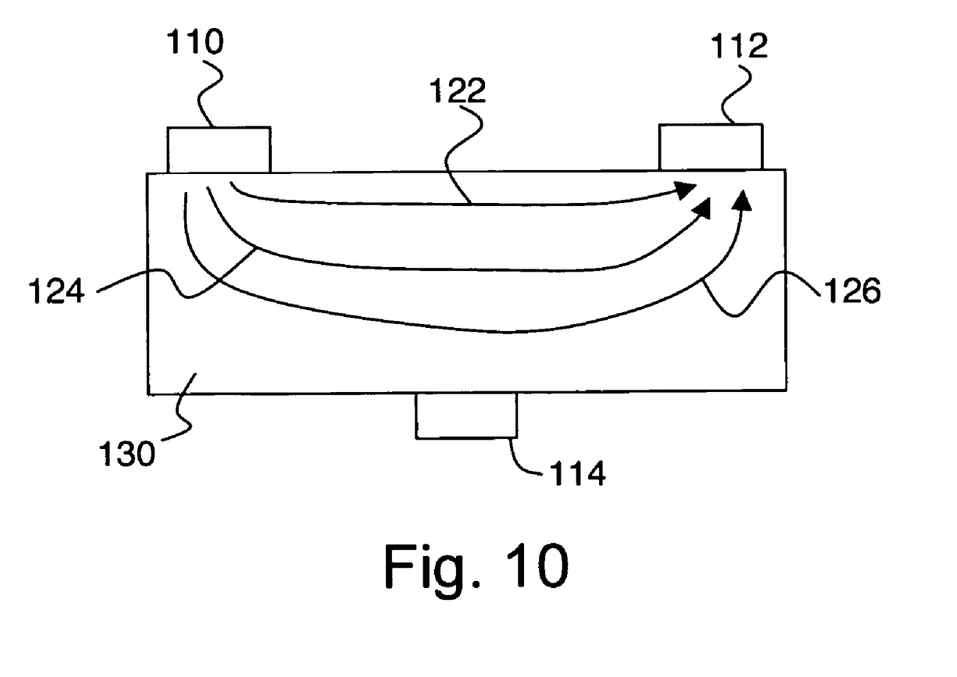
FIG. 10 shows an example non-limiting embodiment making use of surface acoustic waves.

The preceding example relates to the use of bulk acoustic waves for temperature sensing. Surface acoustic waves can also be used. The example of FIG. 10 shows an acoustic source 110 sending surface acoustic waves 122, 124, and 126 to an acoustic receiver 112 through a medium of interest 130 (e.g., the wall of a gun tube). Acoustic waves 122, 124, and 126 have different frequencies, and as a result, they have different propagation depths in medium 130, as shown. A heat source 114 (e.g., an explosion within the gun tube) affects the temperature distribution within medium 130. Since there are effectively multiple acoustic paths between source 110 and receiver 112 (at different depths), more detailed temperature characterization is possible. Multiple frequency waves sense at different depths and are able to generate a composite data matrix from which the internal gun temperature is derived. Spacing between the transducers for gun tube applications can be several inches up to several feet. The measurement is an integral over the propagation path of the temperature at the acoustic wave depth. Thus by operating at several different frequencies, the system can sense the temperature at several depths. This is independent data from that shown for the example of FIG. 1, which sees the entire thickness of the gun tube wall.

Although the example of FIG. 10 shows three acoustic waves, this embodiment can be practiced with any number of acoustic waves. Similarly, the simple 1-D thermal model described above can be extended to more dimensions and/or more realistic boundary conditions as needed.

For gun tube applications, it is noteworthy that measurements can be taken during actual firing of a gun. This opens the door to acquiring new information directly related to the energy of each round. For example, NACO propellant has a very different heat profile from EX99. Firing missions may include conventional rounds with ERGM rounds. This system has the potential to provide quantitative results for any combination of propellants at any firing rate. Embodiments can be mounted on any size gun and become both a local cook off assessment tool as well as a cost-effective wireless data acquisition system reporting to the on-board ship weapons system computer. The system can be hardened to work in harsh environments including vibration, smoke, heat, cold, rain, as expected on a ship gun.

Figure 3:
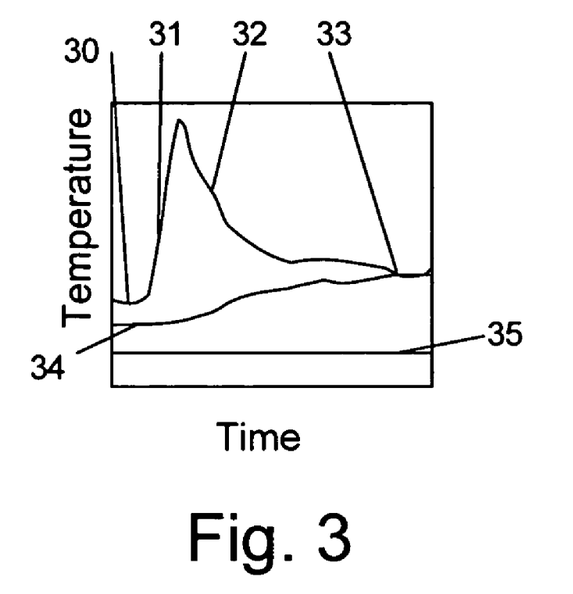
FIG. 3 indicates the temperature at three different depths in the tube.

FIG. 3 indicates the temperature at three different depths into the tube as a function of time. The thermal line starting at equilibrium 30 is at the inside surface of the tube. It quickly heats up after the explosion 31 and quickly cools down 32 as the heat diffuses into the tube after the hot gases have passed. The surface moves to a new thermal equilibrium 33. The temperature of the center line of the tube is shown by the thermal line starting at 34. Here we see the delayed response as the thermal wave moves from the surface into the tube. The temperature of the outside surface for this case is shown by the thermal line 35. For these times, the thermal wave has not reached the outer face and it is yet to be altered by the explosion.

Figure 4:
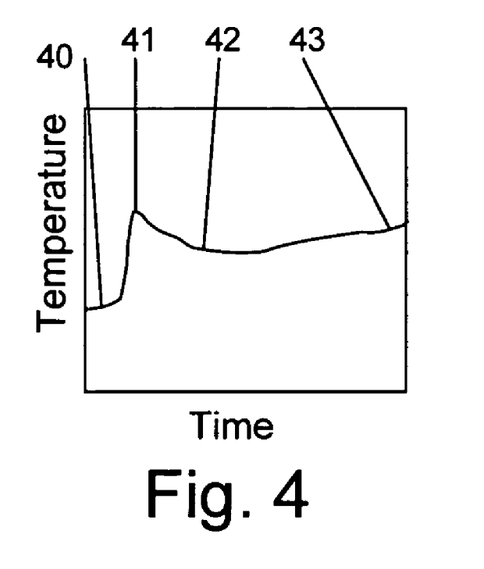
FIG. 4 is a sketch of test results in the tube of FIG. 1.

FIG. 4 shows an idealized sketch of test results in the tube of FIG. 1. Here the explosion 16 occurs after a period of thermal stability 40 causing a change in the integrated acoustic response of the tube/sensor system 41. As the heat from the explosion diffuses into the bulk of the tube, the change in frequency continues to change 42 and moves toward a new thermal equilibrium 43. Left alone, the tube will eventually come back to thermal equilibrium with its local environment. With DAT, the entire thermal history of the tube is determined knowing the time rate of change in the integrated acoustic response, the acoustic thermal equilibrium calibration factors, and the thermal diffusion constants of the tube.

Figure 5:
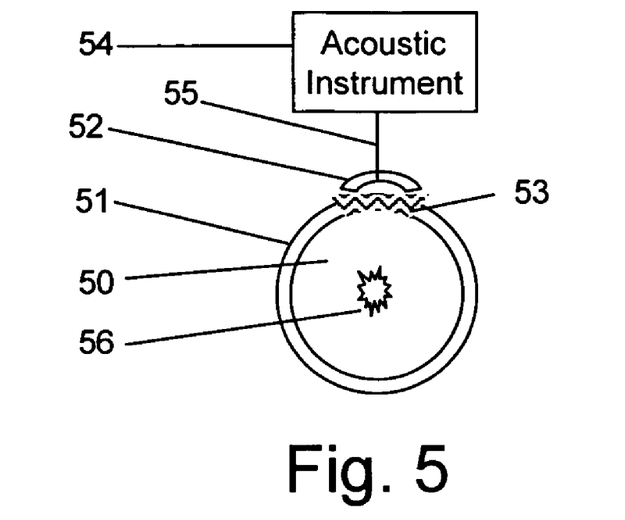
FIG. 5 shows another example non-limiting embodiment.

FIG. 5 shows a different embodiment of a dynamic acoustic thermometer (DAT). In this case the system is looking at a medium that is heated and the desired measurement is of the internal medium 50, not the containment medium. The containment medium 51 holds a medium of interest such as water 50. The acoustic transducer 52 sends an acoustic wave 53 into the medium of interest. The acoustic instrument 54 generates the energy and sends it through a connection 55 required to launch the acoustic wave. The wave reflects back into the transducer 52 and is converted to a signal back into the instrument 54. A heat source, such as a pulsed beam of ionizing radiation 56 heats the medium 50 changing the acoustic response of the medium. The instrument measures that change. In this example, the acoustic path is a round trip beginning and ending at transducer 52.

Figure 6:
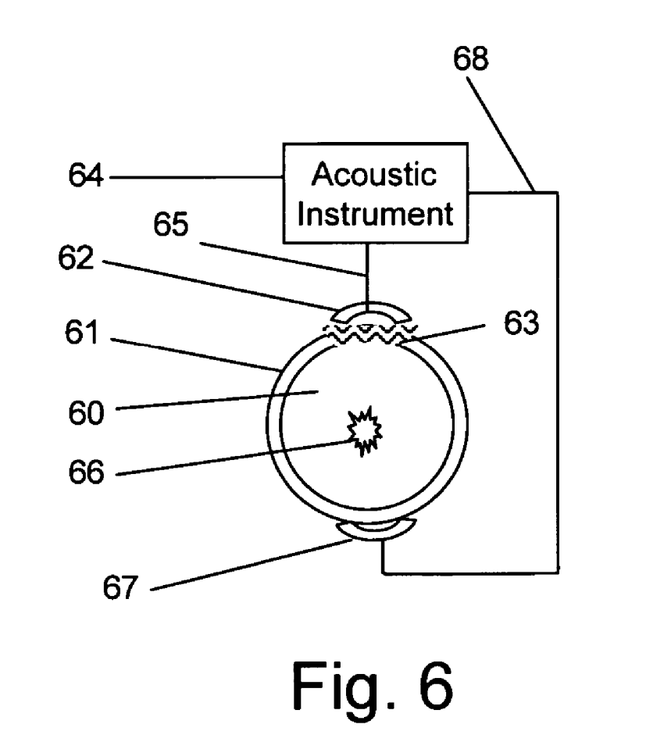
FIG. 6 shows an example non-limiting embodiment having transducers working in a through-transmission measurement.

FIG. 6 shows an embodiment using two transducers in a through transmission measurement. The medium 60 is within a containment medium 61. The acoustic transducer 62 sends an acoustic wave 63 into the medium of interest. The acoustic instrument 64 generates the energy and sends it through a connection 65 required to launch the acoustic wave. A heat source, such as a pulsed beam of ionizing radiation 66 heats the medium 60 changing the acoustic response of the medium. The acoustic wave is transmitted to a second transducer 67 and is converted to a signal communicated back into the instrument via a connection 68. The instrument measures that change. In this example, the acoustic path is from transducer 62 to transducer 67.

Figure 7:
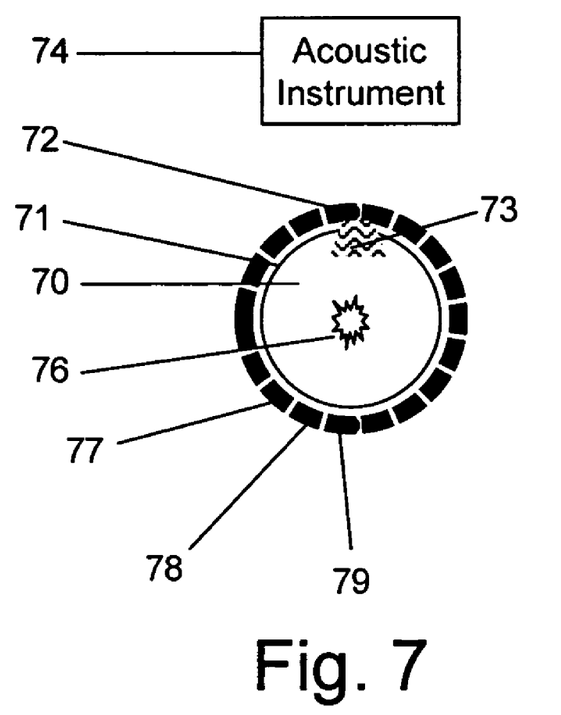
FIG. 7 shows an example non-limiting embodiment having multiple transducers.

FIG. 7 shows a multi-transducer approach that permits the measurement of the temperature as a function of position (i.e., a temperature distribution) using multiple acoustic paths. The medium of interest 70 is within containment medium 71. Multiple acoustic transducers are around the containment medium with one of the transducers (e.g., transducer 72) acting as a transmitter. Each transducer, one at a time, can act as a transmitter in the measurement cycle. An acoustic wave 73 is shown moving into the medium of interest. The acoustic instrument 74 generates the energy and sends it through a connection (not shown) required to launch the acoustic wave from transducer 72. A heat source, such as a beam of radiation 76 heats the medium 70 changing the acoustic response of the medium. All transducers can be used as receivers. For this example, transducer 77, 78 and 79 are shown being used as receivers at the same time. They each measure a different part of the transmitted wave. Data from "N" transducers around the medium form a single tomographic projection of the medium from the acoustic wave emitted by the transmitter. Each such projection is stored in the acoustic instrument and the position of the transmitter is incremented around the circle (or square or any arbitrary shape). In this way, the acoustic instrument builds up an array of integrated acoustic data representing multiple paths through the medium of interest. By using tomography, the array of data can be inverted to determine the thermal profile of the heat source beam in terms of the deposited heat in the medium of interest. The resulting information can be presented as an image of the temperature profile in the medium characterizing the source of heat, in this example, the intensity shape of the radiation beam. The heat profile can be replaced with a pressure profile or force profile so long as the profile alters the acoustic phase between the transmitter and the receiver.

Figure 8:
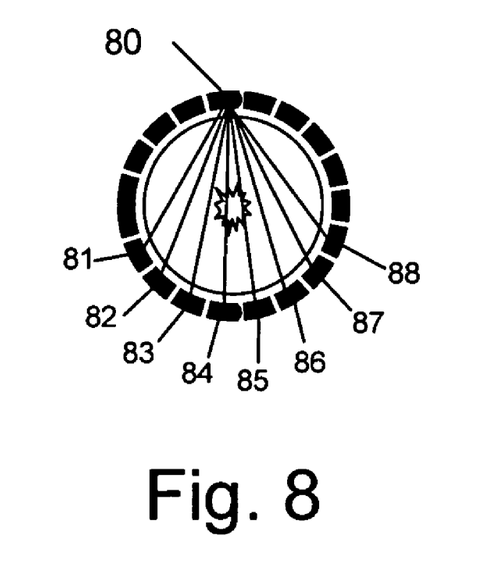
FIG. 8 shows a source transducer launching waves to be received by 8 transducers on the opposite side of the medium.

FIG. 8 shows an instant in time when the source transducer 80 has launched waves that propagate to all 8 transducers for a given excitation to the opposite side of the medium. The wave paths shown (81-88) are representative of possible acoustic paths between the source and the receivers. Some of the paths (e.g., 84) pass directly through the heated zone while other paths miss it (e.g., 88).

Figure 9:
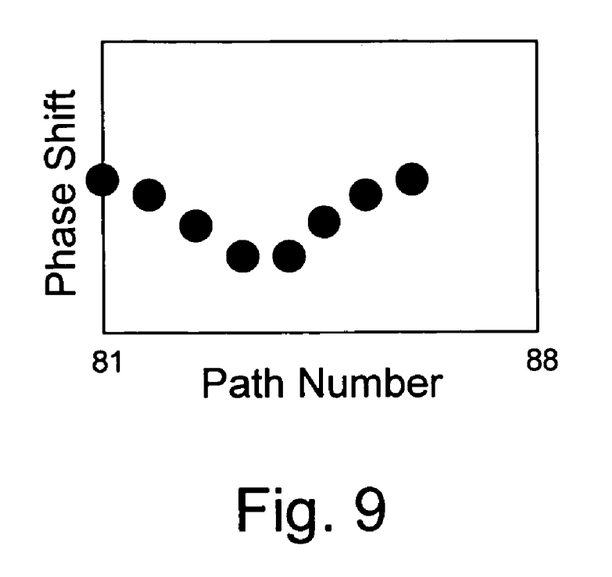
FIG. 9 schematically shows acoustic phase shifts for each of the paths in FIG. 8.

FIG. 9 schematically shows acoustic phase shifts for each of the paths in FIG. 8. The paths that include more of the heated zone will have the highest average acoustic velocity resulting in a decrease in phase shift.

The invention claimed is:

1. A method for measuring temperature at a remote location of a structure that includes a first surface on one side of the structure and a second surface on another side of the structure, where a perpendicular distance between the first and second surfaces defines a thickness of the structure, the method comprising:
providing at a source location an acoustic source transducer disposed on or near the first surface of the structure and separated from the remote location;
providing at a receiver location an acoustic receiver transducer disposed on or near the first surface of the structure and separated from the remote location;
propagating acoustic radiation from the source transducer to the receiver transducer through a medium along a path that passes through or near the remote location;
measuring multiple times an acoustic delay associated with propagating the acoustic radiation along the path;
integrating the multiple measured acoustic delays to obtain an integrated acoustic delay;
measuring a change in the integrated acoustic delay as a function of time; and
processing the measured change in the integrated acoustic delay using a thermal-acoustic model relating a non-uniform temperature distribution along the path with a non-uniform distribution of acoustic propagation velocity along the path to determine the change in the remote location temperature.

2. The method of claim 1, wherein said acoustic radiation is held to a constant frequency, and wherein said change in the integrated acoustic delay is obtained from an acoustic phase measurement.

3. The method of claim 1, wherein said acoustic radiation is held to a constant phase shift along said path, and wherein said change in the integrated acoustic delay is obtained from an acoustic frequency measurement.

4. The method of claim 1, wherein said source location and said receiver location coincide, and wherein a single transducer acts as said acoustic source and as said acoustic receiver.

5. The method of claim 1, wherein said thermal-acoustic model includes a temperature at said source location, a temperature at said receiver location, and a heat source geometry at said remote location.

6. The method of claim 1, further comprising providing one or more additional acoustic sources and/or acoustic receivers, wherein one or more additional changes in integrated acoustic delays between one of said acoustic sources and one of said acoustic receivers along one or more corresponding additional paths are measured, and wherein a temperature distribution at said remote location is determined by relating the measured changes in acoustic delays to the remote location temperature distribution with said combined thermal-acoustic model.

7. The method of claim 6, further comprising performing a tomographic inversion of said changes in integrated acoustic delay along said paths to provide said remote location temperature distribution.

8. The method of claim 1, wherein said remote location is on an interior surface of a gun tube and wherein said source location and said receiver location are on an exterior surface of a gun tube.

9. The method of claim 1, wherein said remote location is within a water tank and wherein said source location and said receiver location are at a wall of the water tank, and further comprising providing incident radiation to the water tank and determining a dose of the incident radiation from said remote location temperature.

10. The method of claim 1, further comprising providing one or more additional acoustic sources and/or acoustic receivers, wherein one or more additional changes in integrated acoustic delays between one of said acoustic sources and one of said acoustic receivers along one or more corresponding additional paths are measured, and wherein a temperature distribution at said remote location is determined by relating the measured changes in acoustic delays to the remote location temperature distribution with said combined thermal-acoustic model, and wherein a spatial distribution of said incident radiation is determined from a temperature distribution at said remote location.

11. The method of claim 1, further comprising calibrating acoustic velocity dependence on temperature for the medium with a temperature sensor disposed away from the remote location.

12. The method in claim 1, wherein the source location is on one side of the structure and the receiver location is on the same side of the structure.

13. The method in claim 1, wherein the remote location is closer to the second surface than the first surface and the source and receiver locations are separated from the remote location by at least the structure.

14. The method in claim 1, wherein the processing determines the change in the remote location temperature by computationally inverting the thermal-acoustic model.

15. A system for measuring temperature at a remote location of a structure that includes a first surface on one side of the structure and a second surface on another side of the structure, where a perpendicular distance between the first and second surfaces defines a thickness of the structure, comprising:
an acoustic source transducer located at a source location disposed on or near the first surface of the structure and separated from the remote location;
an acoustic receiver transducer located at a source location disposed on or near the first surface of the structure and separated from the remote location;
wherein the source transducer is configured to propagate acoustic radiation to the receiver transducer through a medium along a path that passes through or near the remote location; and
a processor configured to measure multiple times an acoustic delay associated with propagating the acoustic radiation along the path and to integrate the multiple measured acoustic delays to obtain an integrated acoustic delay as a function of time,
wherein the processor is further configured to process the measured change in the integrated acoustic delay using a thermal-acoustic model relating a non-uniform temperature distribution along the path with a non-uniform distribution of acoustic propagation velocity along the path to determine the change in the remote location temperature.

16. The system of claim 15, wherein said acoustic radiation is held to a constant frequency, and wherein said change in the integrated acoustic delay is obtained from an acoustic phase measurement.

17. The system of claim 15, wherein said acoustic radiation is held to a constant phase shift along said path, and wherein said change in the integrated acoustic delay is obtained from an acoustic frequency measurement.

18. The system of claim 15, wherein said source location and said receiver location coincide, and wherein a single transducer acts as said acoustic source and as said acoustic receiver.

19. The system of claim 15, wherein said thermal-acoustic model includes a temperature at said source location, a temperature at said receiver location, and a heat source geometry at said remote location.

20. The system of claim 15, further comprising one or more additional acoustic sources and/or acoustic receivers, wherein one or more additional changes in integrated acoustic delays between one of said acoustic sources and one of said acoustic receivers along one or more corresponding additional paths are measured, and wherein a temperature distribution at said remote location is determined by relating the measured changes in the acoustic delays to the remote location temperature distribution with said combined thermal-acoustic model.

21. The system of claim 20, wherein a tomographic inversion of said changes in the integrated acoustic delays along said paths is performed to provide said remote location temperature distribution.

22. The system of claim 15, wherein said remote location is on an interior surface of a gun tube and wherein said source location and said receiver location are on an exterior surface of a gun tube.

23. The system of claim 15, wherein said remote location is within a water tank and wherein said source location and said receiver location are at a wall of the water tank, and further comprising providing incident radiation to the water tank and determining a dose of the incident radiation from said remote location temperature.

24. The system of claim 15, further comprising one or more additional acoustic sources and/or acoustic receivers, wherein one or more additional changes in integrated acoustic delays between one of said acoustic sources and one of said acoustic receivers along one or more corresponding additional paths are measured, and wherein a temperature distribution at said remote location is determined by relating the measured changes in the acoustic delays to the remote location temperature distribution with said combined thermal-acoustic model, and wherein a spatial distribution of said incident radiation is determined from a temperature distribution at said remote location.

25. The system of claim 15, further comprising a temperature sensor disposed away from the remote location for calibrating said system.

26. The system in claim 15, wherein the source location is on one side of the structure and the receiver location is on the same side of the structure.

27. The method in claim 15, wherein the remote location is closer to the second surface than the first surface and the source and receiver locations are separated from the remote location by at least the structure.

28. The system in claim 15, wherein the processor is configured to determine the change in the remote location temperature by computationally inverting the thermal-acoustic model.

* * * * *